(12) United States Patent
Memminger et al.

(10) Patent No.: US 8,648,505 B2
(45) Date of Patent: Feb. 11, 2014

(54) ELECTRICAL MACHINE WITH MULTIPLE COOLING FLOWS AND COOLING METHOD

(75) Inventors: Oliver Memminger, Neuburg a. Inn (DE); Friedrich Schöberl, Ruhstorf a.d. Rott (DE); Norbert Schönbauer, Bad Füssing (DE); Johann Stegner, Ruhstorf (DE); Robert Danner, Tettenweis (DE); Jürgen Draber, Passau (DE); Daniel Friedl, Fürstenzell (DE); Anatoli Vogel, Passau (DE)

(73) Assignee: Siemens Aktiengesellschaft, München (DE)

(*) Notice: Subject to any disclaimer, the term of this patent is extended or adjusted under 35 U.S.C. 154(b) by 279 days.

(21) Appl. No.: 13/141,538

(22) PCT Filed: Nov. 24, 2009

(86) PCT No.: PCT/EP2009/065737
§ 371 (c)(1),
(2), (4) Date: Jun. 22, 2011

(87) PCT Pub. No.: WO2010/072499
PCT Pub. Date: Jul. 1, 2010

(65) Prior Publication Data
US 2011/0278969 A1    Nov. 17, 2011

(30) Foreign Application Priority Data
Dec. 23, 2008   (DE) .......................... 10 2008 064 495

(51) Int. Cl.
*H02K 9/00* (2006.01)
*H02K 9/18* (2006.01)
*H02K 9/02* (2006.01)
*H02K 5/18* (2006.01)
*H02K 5/20* (2006.01)

(52) U.S. Cl.
USPC .................. 310/59; 310/52; 310/58; 310/60 A

(58) Field of Classification Search
USPC ................................ 310/52, 58, 59, 61, 60 A
IPC ..................... H02K 5/20,5/18, 9/00, 9/02, 9/18, H02K 9/04
See application file for complete search history.

(56) References Cited

U.S. PATENT DOCUMENTS

| | | | |
|---|---|---|---|
| 3,675,056 A * | 7/1972 | Lenz ................................ | 310/54 |
| 3,939,907 A * | 2/1976 | Skvarenina ..................... | 165/86 |
| 4,862,023 A * | 8/1989 | Laumond et al. ............... | 310/54 |
| 4,876,470 A * | 10/1989 | Geller ............................. | 310/59 |
| 5,602,435 A * | 2/1997 | Iseli et al. ....................... | 310/55 |

(Continued)

FOREIGN PATENT DOCUMENTS

| | | |
|---|---|---|
| CH | 174 436 A | 1/1935 |
| DE | 616 524 C | 7/1935 |

(Continued)

OTHER PUBLICATIONS

Machine Translation of JP2008228523, Yoshida, Sep. 2008.*

*Primary Examiner* — Tran Nguyen
*Assistant Examiner* — Terrance Kenerly
(74) *Attorney, Agent, or Firm* — Henry M Feiereisen LLC

(57) ABSTRACT

An electrical machine with a stator has a winding support, which has at least one radial cooling slot, and a rotor, which likewise has at least one radial cooling slot. The winding support of the stator has on its outer shell a number of axially running cooling ribs, along which an axially running first cooling flow can be directed. Furthermore, the rotor has axially running first cooling ducts, which open out into its at least one radial cooling slot, so that a second cooling flow can be directed in the axial direction along the axial cooling ribs of the stator through the axial first cooling ducts of the rotor, the at least one radial cooling slot of the rotor, the air gap between the rotor and the stator and the at least one radial cooling slot. In this way, the stator can be cooled by two different cooling flows.

5 Claims, 1 Drawing Sheet

(56) References Cited

U.S. PATENT DOCUMENTS

| | | | |
|---|---|---|---|
| 5,747,900 A * | 5/1998 | Nakamura et al. | 310/58 |
| 6,522,036 B1 * | 2/2003 | Chen | 310/58 |
| 6,552,452 B2 | 4/2003 | Ferguson | |
| 2003/0075996 A1 * | 4/2003 | Yoshida et al. | 310/58 |
| 2004/0189110 A1 * | 9/2004 | Ide et al. | 310/55 |
| 2004/0195931 A1 * | 10/2004 | Sakoda | 310/268 |
| 2007/0024130 A1 * | 2/2007 | Schmidt | 310/61 |

FOREIGN PATENT DOCUMENTS

| | | | |
|---|---|---|---|
| DE | 14 88 657 A1 | 6/1969 | |
| EP | 0 522 210 A1 | 1/1993 | |
| EP | 1 050 949 A1 | 11/2000 | |
| EP | 1 455 433 A1 | 9/2004 | |
| FR | 1 350 043 A | 1/1964 | |
| GB | 1 354 247 A | 6/1974 | |
| JP | 2008228523 * | 9/2008 | H02K 1/32 |
| RU | 36586 U1 | 3/2004 | |
| RU | 2231195 C1 | 6/2004 | |
| RU | 2258295 C2 | 8/2005 | |
| RU | 2291545 C2 | 1/2007 | |
| SU | 1746478 A1 | 7/1992 | |

* cited by examiner

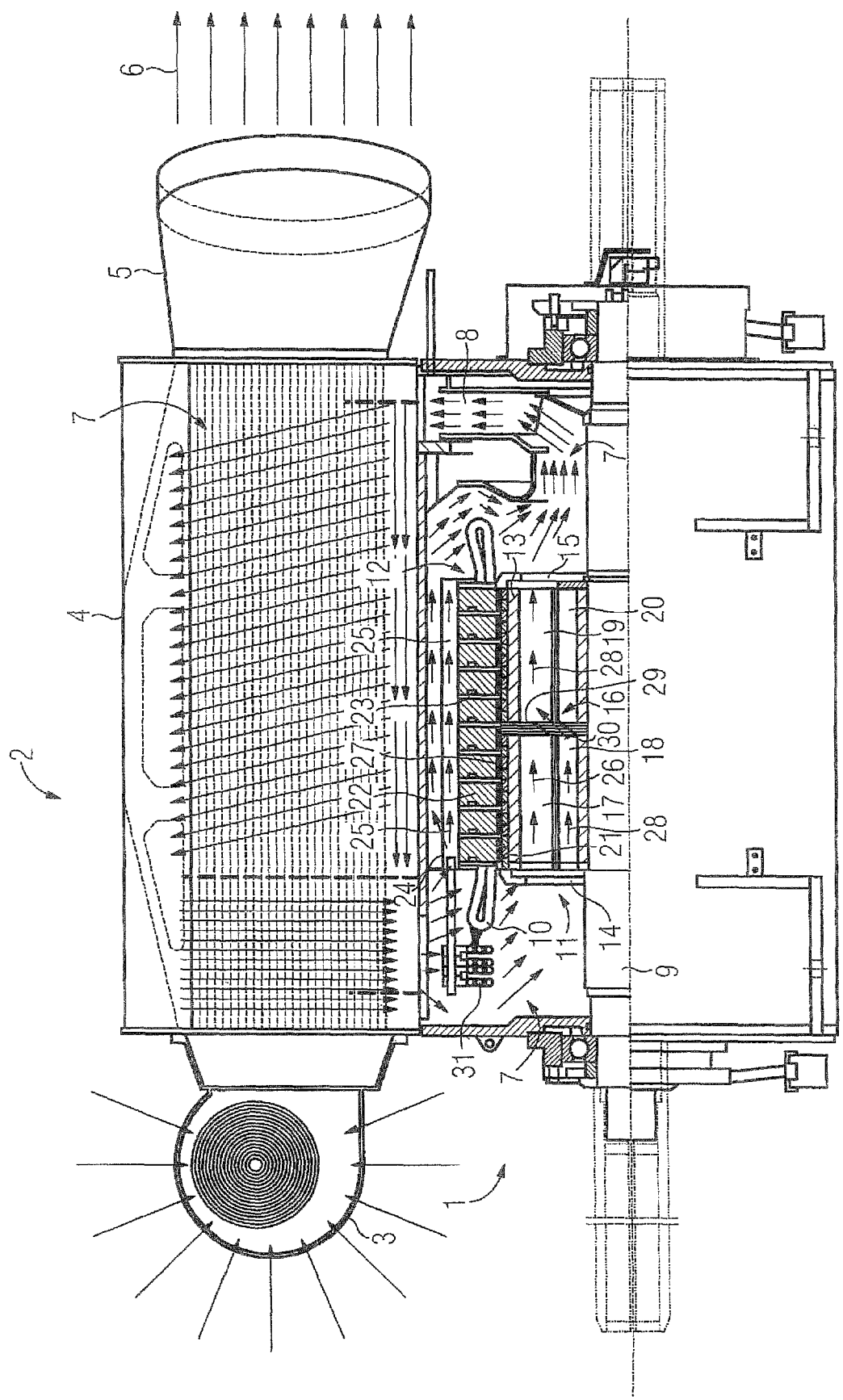

ELECTRICAL MACHINE WITH MULTIPLE COOLING FLOWS AND COOLING METHOD

CROSS-REFERENCES TO RELATED APPLICATIONS

This application is the U.S. National Stage of International Application No. PCT/EP2009/065737, filed Nov. 24, 2009, which designated the United States and has been published as International Publication No. WO 2010/072499 and which claims the priority of German Patent Application, Serial No. 10 2008 064 495.1, filed Dec. 23, 2008, pursuant to 35 U.S.C. 119(a)-(d).

BACKGROUND OF THE INVENTION

The present invention relates to an electrical machine having a stator which has a laminated core which has at least one radial ventilation slot, and having a rotor which likewise has at least one radial ventilation slot. The present invention also relates to a method for cooling an electrical machine of this kind.

Radially running cooling slots are often provided both in the rotor and in the stator of electrical machines in order to remove heat from the rotor and the stator. If the electrical machine is a so-called permanent magnet generator, mounting of the permanent magnets in corresponding pockets in the rotor is relatively complex if the rotor has a large number of radial ventilation slots. However, in order to be able to guarantee an adequate amount of heat is removed, the high level of complexity in respect of mounting has been accepted to date. Therefore, to date, permanent magnet generators have been manufactured with an identical number of radial stator and rotor cooling air slots, these ensuring uniform removal of heat. In this case, the rotor, with its cooling slots, serves as a radial fan.

SUMMARY OF THE INVENTION

The object of the present invention is therefore to reduce the complexity in respect of mounting in an electrical machine and, in particular, in an electrical machine with a rotor with permanent magnet excitation. A further aim is to specify a method with which heat can be effectively removed from an electrical machine which is easy to mount.

According to the invention, this object is achieved by an electrical machine having a stator which has a laminated core which has at least one radial cooling slot, and a rotor which likewise has at least one radial cooling slot, with the laminated core of the stator having, on its outer casing, multiple axially running cooling ribs along which an axially running first cooling flow can be routed, and the rotor having axially running first cooling ducts which issue into the at least one radial cooling slot in said rotor, so that a second cooling flow can be routed through the axial first cooling ducts of the rotor, the at least one radial cooling slot in the rotor, the air gap between the rotor and the stator, the at least one radial cooling slot in the stator and in the axial direction along the axial cooling ribs of the stator.

The invention also provides a method for cooling an electrical machine having a stator and a rotor by cooling ribs on the outer casing of the stator by way of an axially running first cooling flow and cooling the rotor and the stator with a second cooling flow which is introduced axially into the rotor, is deflected in the radial direction in the rotor, leaves the rotor in the radial direction and is radially passed on in the stator and continues to run axially over the outer casing of the stator, it also being possible to route each of the cooling flows in the reverse direction through the stator and the rotor.

Therefore, two cooling flows advantageously interact in accordance with the present invention, said cooling flows ensuring particularly effective removal of heat from the stator. In particular, the stator is not supplied solely with preheated cooling medium from the rotor but rather is additionally cooled with "unconsumed" cooling agent at axial cooling ribs by way of a further cooling flow.

In one embodiment, the rotor is excited by permanent magnets. Therefore, the majority of losses are generally produced in the stator. The highly effective cooling of the stator according to the invention has an even more positive effect.

Only a single radial cooling slot preferably passes through the rotor. In general, fewer radial cooling slots can be provided in the rotor of the electrical machine according to the invention than in the prior art since an additional axial cooling flow ensures further heat removal. Nevertheless, an embodiment with only a single radial cooling slot in the rotor is particularly advantageous since the permanent magnets can then each be pushed into the rotor without problems from the end faces and encapsulated.

According to a further preferred embodiment, the axial first cooling ducts of the rotor are located on one side of the cooling slot, axial second cooling ducts (by way of their central axes) are located radially beneath the first cooling ducts in relation to the axis of the rotor, and axial third cooling ducts are located radially level with the first cooling ducts on the other side of the cooling slot, so that a third cooling flow can be routed through the second cooling ducts, the cooling slot and the radial cooling ducts separately from the second cooling flow. In this case, the center of the cooling flow is considered to be the reference point for the radial level (in relation to the rotor axis) of a cooling flow. Changing the cooling levels can advantageously have the effect that heat is removed even from that part of the rotor which is situated downstream by "unconsumed" cooling agent or cooling agent which has not yet been heated.

In addition to this, a fourth cooling flow can be provided which is introduced into the rotor radially level with the second cooling flow, is diverted in the rotor at a radial level beneath the second cooling flow and leaves the rotor at this deeper radial level. As a result, the flow of cooling agent which is already heated is routed toward the shaft after a certain axial distance, said flow of cooling agent no longer having to perform cooling tasks here. The third cooling flow can then take over the cooling tasks in this axial region.

The rotor can also have a pressure disk which has openings to the second or third cooling ducts, which openings are in each case smaller than the cross section of a second or third cooling duct. The volumetric flow rate of the cooling flows in relation to one another can be suitably adjusted by these openings, without the size of the cross section of the cooling ducts in the rotor being reduced.

Specifically, the stator can have a laminated core, and the cooling ribs can be formed by each individual lamination having corresponding projections which project outward. As a result, a laminated stator core with external cooling ribs can be manufactured in a very simple manner since the cooling ribs are already "punched" onto the laminated core. An alternative would involve welding the external cooling ribs onto the laminated stator core. However, welding constitutes an additional working step which can be avoided.

BRIEF DESCRIPTION OF THE DRAWING

The present invention will now be explained in greater detail with reference to the attached drawing which shows a partial cross section through a generator with permanent magnet excitation according to the invention.

DETAILED DESCRIPTION OF PREFERRED EMBODIMENTS

The exemplary embodiments described in greater detail below are preferred embodiments of the present invention.

The FIGURE shows a generator 1 having a cooling device 2. The cooling device 2 has a fan 3 for drawing in cooling air which it blows into a heat exchanger 4. The air flows from there to the outside through an outlet nozzle 5. This defines an external cooling circuit.

The heat exchanger 4 cools an internal, closed cooling circuit 7 using the external cooling circuit 6. The internal cooling circuit 7 is driven by a shaft-mounted fan 8 which is mounted on the B-side of the shaft 9 of the generator 1. The inner cooling circuit flows through the heat exchanger starting from the fan 8 and enters the winding overhang space on the A-side (drive side) of the generator. Here, said internal cooling circuit flows around the winding overhang 10 and the winding circuit 31 and then flows through the rotor 11 and the stator 12, as will be explained in greater detail below. Finally, the cooling agent (in particular air) flows through the winding overhang space on the B-side (non-drive side) of the generator and again reaches the shaft-mounted fan 8 or a corresponding external fan.

The rotor 11 has a laminated core 13, pressure disks or pressure rings 14 and 15 being mounted on the end faces of said laminated core. The rotor 11 is divided into two in its axial direction by a radial cooling slot 16. This cooling slot 16 is formed by a spacer with the disks 29 in this case.

The rotor 11 also has axially running cooling ducts, of which the axial centers lie on two coaxial cylinders. In the text which follows, the radial distance between the center axis of a cooling duct and the axis of the shaft 9 is referred to as the radial level of the cooling duct. According to the present example, the rotor 11 therefore has a first cooling duct and radially therebeneath, that is to say at a lower radial level, a second axial cooling duct 18. A third cooling duct 19 is located on the right-hand side of the radial cooling slot 16, which divides the rotor in the middle, at the same radial level as the first cooling duct 17. A fourth cooling duct 20 is located radially beneath said third cooling duct, again at the same radial level as the second cooling duct 18. Permanent magnets 21 are arranged in the laminated core 13 in a manner distributed over the circumference in pockets which are provided specifically for this purpose. Said permanent magnets are pushed into the rotor from the two end faces and are also encapsulated from the direction of the two end faces. Since the rotor 11 has only a central radial cooling slot 16, the insertion of the magnets and the encapsulation are accordingly simple to implement.

The stator 12 has a laminated core 22 as the winding support, a large number of radially running cooling slots 23 passing through said laminated core. Axially running cooling ribs 24 are integrally formed on the outer casing of the laminated core 22. The cooling ribs 24 project in a star-like manner from the stator 12 and can be welded to the laminated core. As an alternative, each individual lamination of the laminated core 22 has radially protruding projections, so that the stacking of the individual laminations produces the cooling ribs 24.

According to the invention, the inner cooling circuit now has at least two different cooling flows. The first cooling flow 25 runs along the stator casing solely in the axial direction. The axial cooling ribs 24 of the stator are effectively cooled by this flow which is supplied almost directly by the heat exchanger 4 virtually without heat absorption. This first cooling flow 25 is still used to cool the winding overhang at the B-side end.

A second cooling flow 26 is supplied by a cooling agent or cooling air which has already cooled the winding overhang 10 and the winding circuit 31 in the A-side winding overhang space. This second cooling flow passes through the A-side pressure ring 14 and enters the first cooling duct 17 in the rotor 11. The second flow 26 of cooling agent is directed radially outward at the radial cooling slot 16 in the center of the rotor. Said second flow of cooling agent is divided axially in the entire air gap 27 between the rotor 11 and the stator 12. From there, said flow of cooling agent, since the pressure rings 14 and 15 have a somewhat larger diameter than the laminated core of the rotor including the permanent magnets 21, are forced radially outward by the cooling slots 23 in the stator. The second cooling or air flow 26 is connected to the first air flow 25 at the outer face of the stator. The second air flow 26 therefore ensures that the rotor part which is illustrated on the left-hand side in the FIGURE is cooled and that the inner part of the stator is cooled over its entire axial length. The second cooling flow 26 therefore has a substantially Z-shaped profile. It initially flows axially, then radially and then axially again. Therefore, an adequate amount of heat can be removed from the stator 12 together with the linear first cooling flow, even if the rotor has only one radial cooling slot 16 and not a large number of such radial slots.

As in the example illustrated in the FIGURE, a third cooling flow 28 can optionally be provided, this third cooling flow flowing into the second cooling ducts 18 through the pressure plate 14 on the A-side. A spacer is located in the radial cooling slot 16 in the rotor 11. In the present example, three disks 29 are used as spacers. The disks 29 differ and have cutouts 30 in positions which are offset in relation to one another. As a result, the third cooling flow 28 in the radial cooling slot 16 in the FIGURE is forced upward into the third cooling ducts which are located to the right of the cooling slot 16 at a higher radial level than the second cooling ducts 18. Finally, the third cooling flow 28 leaves the third cooling ducts 19 through the B-side pressure plate 15. To this end, openings are provided in the pressure plate 15, the size of said openings being such that the resistance of the third cooling flow 28 is not too low and also the second cooling flow 26 has an adequate volumetric flow rate. Downstream of the opening in the pressure plate 15, the third cooling flow 28 joins the first and second cooling flows 25, 26 in the space in the end face of the generator 1 upstream of the shaft-mounted fan 8. The third cooling flow 28 is therefore guided in the first part of the rotor (left-hand side in the FIGURE) through the cooler region (region close to the shaft) of the rotor. In the process, said third cooling flow absorbs hardly any heat. Said third cooling flow is then guided upward on the right-hand side of the rotor and there serves to effectively cool the rotor part on the right-hand side. The left-hand half of the rotor part is, as explained above, primarily cooled by the second cooling flow 26.

The manner of operation of the cooling principle with two separate cooling flows according to the invention can be summarized as follows: an electrical machine according to the invention and a cooling method according to the invention are designed such that it is possible to design the rotor of the machine, and in particular of a permanent magnet generator, with only one radial cooling slot which is arranged centrally. With a customary design, only one single rotor cooling slot would be inadequate for dissipating losses with Z-type ventilation. With the design according to the invention, it is possible to ensure, in this case without a high level of complexity, specifically on account of there being only one single central cooling slot, that the permanent magnets of the rotor are exactly positioned and are protected against corrosion in the long term (simple pouring of encapsulation compound on both sides). In order to guarantee adequate cooling, the stator core is axially ribbed for additional heat removal. The axially running ribs are recooled with a forced air flow from a shaft-mounted fan. The magnets of the rotor, the region of the air gap and a part of the stator are recooled by a further cooling air flow which is generated by the radial cooling air slot which is arranged in the center of the rotor. A third cooling air flow is optionally made possible by the negative pressure in the shaft-mounted fan and openings in the B-side rotor pressure disk. Changing the levels of the cooling duct in the region of the radial cooling slot in the center of the rotor core has the effect that the second half of the rotor can likewise be supplied with "cold" cooling air. This additional cooling serves to remove heat from the magnets of the second rotor core. The cooling principle according to the invention produces the following advantages, some of which have already been discussed: firstly, there is a cost saving in terms of manufacture since the rotor has to be produced only in two core elements and not, for example, in ten core elements. Furthermore, complete corrosion protection of the used permanent magnets can be achieved by reliable pouring of the encapsulation compound from the end faces of the rotor. Finally, in spite of the radial cooling flow which is not adequate per se, the stator can be sufficiently cooled on account of the axial rib arrangement.

The invention is claimed:

1. An electrical machine, comprising:
a stator including a winding support provided with multiple radial cooling slots and having an outer casing provided with multiple axial cooling ribs along which an axial first cooling flow can be routed; and
a rotor having a single radial cooling slot and provided with axial first cooling ducts which issue into the radial cooling slot in the rotor, so as to enable conduction of a second cooling flow through the axial first cooling ducts of the rotor, the radial cooling slot in the rotor, an air gap between the rotor and the stator, the multiple radial cooling slots in the stator and in the axial direction along the axial cooling ribs of the stator,
wherein the axial first cooling ducts in the rotor axial define second cooling ducts radially beneath the first cooling ducts on one side of the radial cooling slot, and axial third cooling ducts radially level with the first cooling ducts on another side of the radial cooling slot so as to allow conduction of a third cooling flow through the second cooling ducts, the radial cooling slot and the third cooling ducts separately from the second cooling flow,
wherein the windings support has a laminate core of individual laminations with the cooling ribs being formed by providing each individual lamination with projections which project outwards.

2. The electrical machine of claim 1, wherein the rotor is excited by permanent magnets.

3. The electrical machine of claim 1, wherein the rotor includes a pressure ring having openings to the second or third cooling ducts, said openings being sized smaller than a cross section of a second or third cooling duct.

4. A method for cooling an electrical machine having a stator which has a winding support having a laminate core of individual laminations, and a rotor, said method comprising the steps of:
cooling ribs arranged on an outer casing of the winding support and formed as projections provided in each individual lamination and projecting outwards, by an axial first cooling flow;
cooling the rotor and the stator with a second cooling flow which is introduced axially into the rotor and is deflected in a radial direction in the rotor and which leaves the rotor in the radial direction and continues to flow radially in the stator and to flow axially over the outer casing of the stator; and
cooling the rotor by a third cooling flow which is introduced into the rotor radially beneath the second cooling flow and routed within the rotor radially level with the second cooling flow and which leaves the rotor separately from the second cooling flow radially level with the second cooling flow.

5. The method of claim 4, further comprising the steps of introducing a fourth cooling flow into the rotor radially level with the second cooling flow, and directing the fourth cooling flow in the rotor at a radial level beneath the second cooling flow so as to leave the rotor at said radial level.

* * * * *